July 14, 1964

J. K. BARROW, JR 3,140,921

APPARATUS FOR PRODUCING A FERTILIZING MIXTURE

Filed Oct. 13, 1961

John K. Barrow, Jr.
INVENTOR.

BY
Attorneys

July 14, 1964 J. K. BARROW, JR 3,140,921
APPARATUS FOR PRODUCING A FERTILIZING MIXTURE
Filed Oct. 13, 1961 3 Sheets-Sheet 2
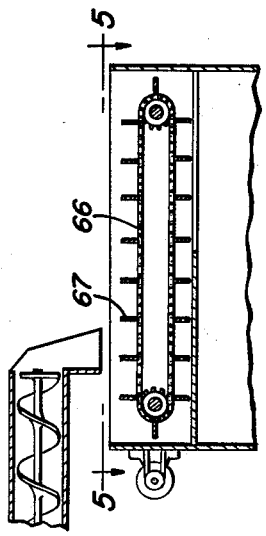
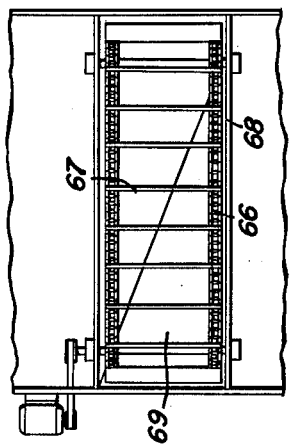
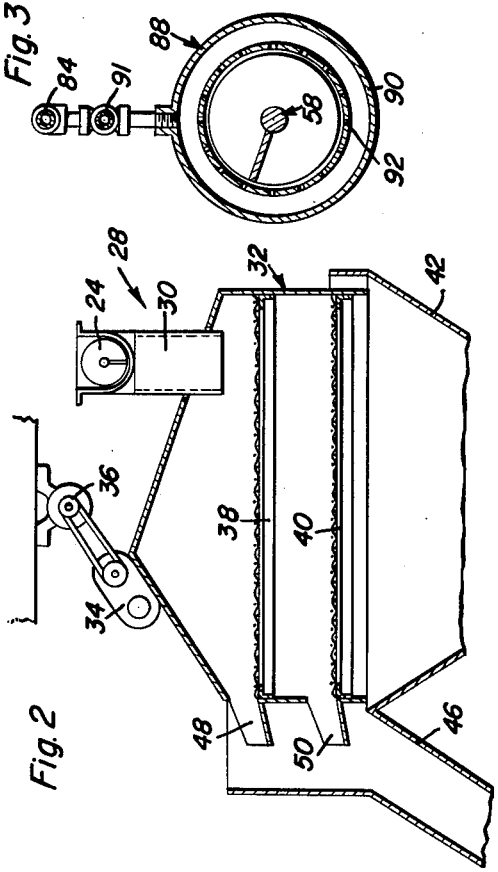
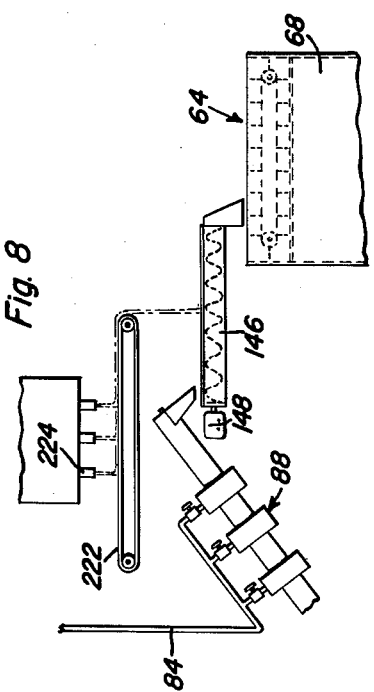
John K. Barrow, Jr.
INVENTOR.

July 14, 1964   J. K. BARROW, JR   3,140,921
APPARATUS FOR PRODUCING A FERTILIZING MIXTURE
Filed Oct. 13, 1961   3 Sheets-Sheet 3
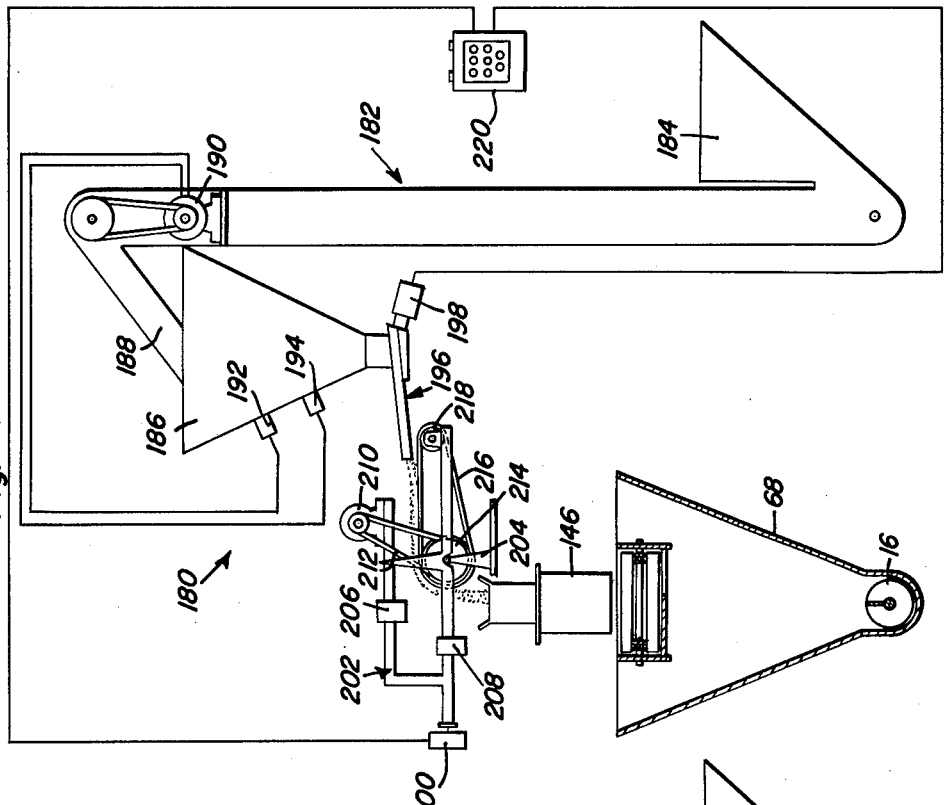
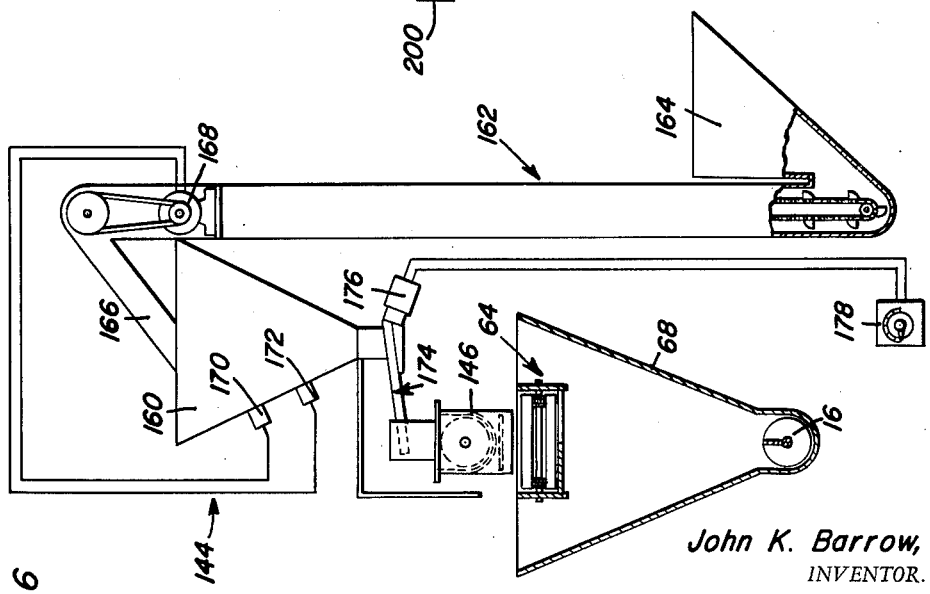
John K. Barrow, Jr.
INVENTOR.

United States Patent Office 3,140,921
Patented July 14, 1964

3,140,921
APPARATUS FOR PRODUCING A FERTILIZING MIXTURE
John K. Barrow, Jr., P.O. Box 68, Ahoskie, N.C.
Filed Oct. 13, 1961, Ser. No. 144,999
6 Claims. (Cl. 23—259.1)

This invention relates to a process and apparatus for treating a solid nutrient carrier such as tree bark with plant nutrients and in particular relates to a continuous process for mixing predetermined proportions of prepared tree bark with plant nutrients in both liquid and solid form. This application is therefore a continuation-in-part of my prior co-pending application No. 95,575, filed March 14, 1961.

The preparation and treatment of tree bark with plant nutrient has heretofore been accomplished by a "batch" process in which the ingredients of the mixture come to rest for measuring and mixing purposes. The process of the present invention however is a continuous one in which the ingredients are measured and mixed while they are in motion. As a result thereof, the process may be accomplished and a more rapid manner and accuracy in the proportion of the ingredients may be maintained in a more reliable manner than was heretofore thought possible. The process of the present invention therefore is similar to the process disclosed in the aforementioned co-pending application however includes further features rendering it even more advantageous. It is therefore a primary object of this invention to provide a continuous process for preparing tree bark or the like and mixing it in predetermined constant proportions with plant nutrients of different forms and types in a more rapid and accurately reliable manner.

Another object of this invention is to provide a novel process and apparatus for preparing tree bark or the like with plant nutrient in a continuous manner and under the control of a single operator with the process continuing for an indefinite period of time.

It is a further object of this invention to provide a process apparatus for continuously preparing and treating tree bark with plant nutrients, the process being regulatable and varied in accordance with the supply of tree bark, the type and form of nutrient available and the demands on the output of the process.

In accordance with the foregoing objects, the process of the present invention involves grinding or comminuting of a raw material such as tree bark as the nutrient carrier. The ground up carrier is then collected within a surge bin for deposit into a variable speed conveyor from which the ground up carrier passes through a visual screen mechanism for the purpose of separating therefrom carrier particles of acceptable size and to enable monitoring of the available quantity thereof so that the variable speed conveyor may be varied pursuant thereto for the purpose of maintaining a continuous supply of accepted carrier particles. The accepted carrier particles are then delivered to a constant feed conveyor for metering thereof in order to produce a constant volumetric flow rate of the carrier material. Liquid is then introduced to the carrier materials at a controllable rate and in preselected relation to the constant volumetric flow rate of the carrier materials by apparatus under control of the operator for the purpose of either adding a liquid nutrient, a preblend of liquid nutrients or to supply sufficient moisture to the carrier material for conditioning thereof by coating and/or penetration of the materials so that it may better mix with solid nutrients subsequently added. The liquid treated carrier material is then conveyed at a constant rate for the introduction thereto of the solid nutrient. Either one or a plurality of different solid nutrients differing as to flow rate, particle size and type dependent upon what is best suitable, available or called for, is added. The solid nutrients may be added therefore at a regulated flow rate so as to either obtain a constant volumetric flow or a constant weight rate of flow. The mixture is then discharged into a spreader mechanism for evenly distributed supply in response to the intermittent demand of a bagging machine.

The process of the present invention therefore includes all of the advantages described with respect to the aforementioned copending application but in addition thereto enables one to introduce plant nutrient into the fertilizer mixture in accordance with the number, form and type of nutrients that are both suitable from the standpoint of price, handling and cost of transportation. Further, a product may be produced by the process with variations that may be easily effected in accordance with customer demand. Finally, the process of the present invention may better take advantage of the physical properties of the mixture components by the various variations and adjustments of the process.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a partial sectional view of a portion of the apparatus taken through a plane indicated by section line 2—2 of FIGURE 1.

FIGURE 3 is a partial sectional view taken through a plane indicated by section line 3—3 in FIGURE 1.

FIGURE 4 is a partial sectional view of the spreader mechanism.

FIGURE 5 is a partial top plan view of the spreader mechanism taken through a plane indicated by section line 5—5 in FIGURE 4.

FIGURE 6 is a partial sectional view taken substantially through a plane indicated by section line 6—6 in FIGURE 1, illustrating the solid nutrient introducing mechanism.

FIGURE 7 is a view similar to that of FIGURE 6 illustrating another form of solid nutrient introducing mechanism.

FIGURE 8 is a partial diagrammatic view of the apparatus of the present invention illustrating modified arrangement.

Figure 1:
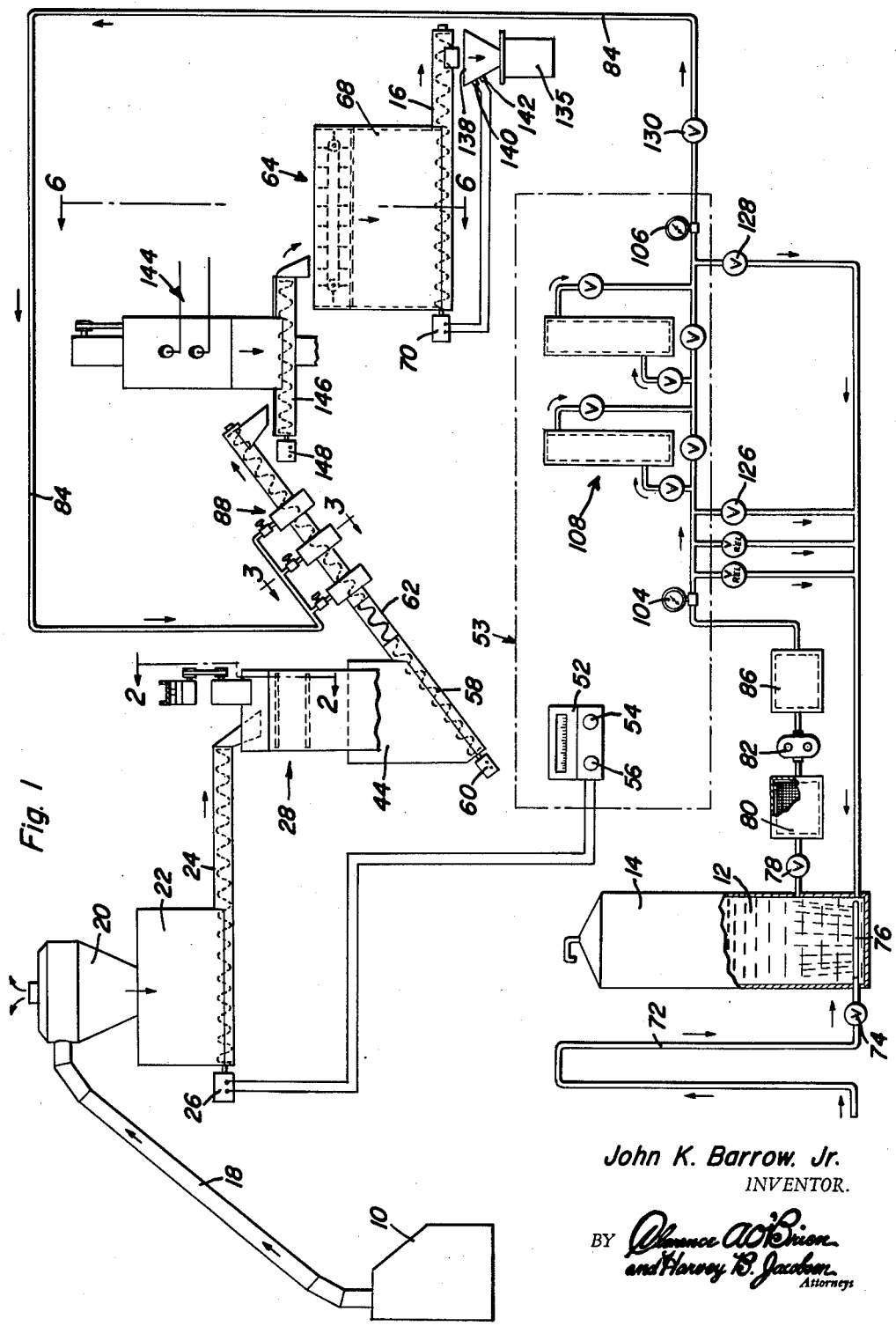
FIGURE 1 is a diagrammatic illustration of the apparatus of the present invention through which the process may be practiced.

Referring now to the drawings in detail, the system of the present invention is illustrated in FIGURE 1. The process involved in this system is operative to prepare tree bark for mixing in a predetermined proportion with plant food nutrients in liquid and/or solid form which may consist of pre-blend of ingredients such as nitrogen, phosphoric acid, potash, etc. The tree bark is removed from logs by any suitable type of mechanical debarker, and ground up by a hammer mill type grinder generally referred to by reference numeral 10. The grinder produces a large percentage of ground bark particles within the desired range of sizes for the purposes of the products being produced by the process of the present invention. It will therefore be observed from FIGURE 1, that the grinder and blower mechanism constitutes the starting point of the process. The desired liquid whether it be water, or a liquid nutrient, referred to by reference numeral 12 is stored within a storage tank 14 from which it is drawn for mixing with the tree bark.

The tree bark and the liquid proceed respectively from the mechanism 10 and the storage tank 14 through the process apparatus while at the same time solid nutrients are added by means of a solid nutrient introducing mechanism generally referred to by reference numeral 144. The product is then delivered to a bagging machine 135 by the constant delivery conveyor generally referred to by reference numeral 16. As long as the grinder blower mechanism 10 is supplied with tree bark the solid nutrient introducing apparatus 144 with solid nutrients and the storage tank 14 supplied with liquid, a continuously operating process will supply the variable demands of the bagging machine connected to the delivery conveyor 16.

The ground tree bark is blown by an exhaust fan (not shown) located within the mechanism 10 to a conduit 18 as indicated by the arrows in FIGURE 1 into a cyclonal type metal collector 20. The ground bark conveying air is exhausted from the top of the collector while the ground up tree bark drops from the collector into a surge bin 22.

From the surge bin 22, the ground tree bark is fed by a variable speed screw feeding conveyor 24 which is driven by a variable speed motor 26. The variable speed feeding conveyor 24 carries the ground up tree bark into a visible flow vibrating screen mechanism generally referred to by reference numeral 28. Referring now to FIGURE 2 in particular, it will be observed that the conveyor 24 includes a terminal portion 30 through which the ground up tree bark is delivered to a vibrating screen assembly generally referred to by reference numeral 32. The screen assembly is accordingly vibrated by means of a vibrating mechanism drivingly connected to a motor 36. Disposed within the screen assembly 32 is an upper screen 38 and a lower screen 40. The upper screen 38 is of larger mesh and is effective in response to vibration thereof to screen out stringy cambium particles or strips which are objectionable material. The lower screen which is of a smaller mesh, controls the size of the accepted material which is discharged therethrough into a delivery chute 42 which deposits the tree bark particles within the desired predetermined range of sizes into a surge bin 44, the top of which is arranged at low level enabling the operator to look into the bin so as to observe the amount of ground bark available. The flow of material into the surge bin 44 will therefore be visible to the operator who may accordingly control the speed of the variable speed motor 26 for maintaining the flow out of the vibrating screen mechanism 28 at an approximately constant rate so as to maintain the process operative for indefinite periods of time. The waste material is conducted to a waste conveyor by means of the waste chute 46 as seen in FIGURE 2 which is supplied with waste material from outlet spouts 48 and 50 mounted on the vibrating screen assembly 32 adjacent to the end of the screens 38 and 40, respectively.

The oversized and undesirable tree bark particles rejected by the vibrating screen may accordingly be removed from the process. The ground bark particles of the desired size and quality on the other hand will be delivered to the surge bin 44. In order to control the quantity of desirable screen bark delivered to the surge bin 44, the variable speed motor 26 is operatively connected to a remote control member 52 including a speed indicating mechanism and a pair of control buttons 54 and 56 by means of which the operator may increase or decrease the speed of the motor 26. The control mechanism 52 is accordingly mounted on a control panel 53 located so that the flow through the vibrating screen mechanism 28 may be observed by the operator so that he may appropriately control the speed of the motor 26. It will be appreciated however, that alternatively automatic control mechanisms may be utilized for varying the speed of the motor 26 in response to variations in the flow of the vibrating screen mechanism 28. It will be appreciated that a variation in supply of tree bark will be necessary inasmuch as no load of tree bark will have a uniform proportion of the desirable particles.

The surge bin 44 also, must at all times contain a sufficient quantity of screened tree bark to keep the constant speed conveyor 58 full of bark for delivering a constant volume thereof. The constant speed conveyor mechanism 58 is accordingly driven by a constant speed motor 60 with the lower end thereof being connected to and in communication with the interior of the surge bin 44. The screened tree bark will accordingly be conveyed upwardly through the constant speed conveyor mechanism 58. A metering mechanism 62 is disposed within the conveyor mechanism 58 through which the tree bark passes so that the screened tree bark will continue therefrom through the conveyor mechanism 58 at a constant volumetric rate of speed. After passing through the metering mechanism 62 within the constant speed conveyor 58, the ground, screened and metered bark is then sprayed with a liquid which may be either water, a liquid nutrient or a preblend of liquid nutrients. The tree bark so treated with the liquid is then discharged from the upper end of the conveyor mechanism 58 into a constant speed mixing conveyor 146 driven by the motor 148. As the mixture is conveyed along the conveyor 146, solid nutrients are introduced thereto by means of the apparatus 144 as will be explained hereafter in further detail. The mixture is then discharged onto a spreader mechanism generally referred to by reference numeral 64.

Referring therefore to FIGURES 4 and 5 in particular, it will be observed that the spreader mechanism may include a constantly moving apertured endless chain conveyor 66 having slats 67 connected thereto. A triangular plate 69 over which the slats 67 move provides a progressively enlarged opening in a direction away from the outlet of the conveyor mechanism 58 to evenly deposit the ground, screened, metered and treated bark into the surge bin 68 for delivery of uniformly distributed particles in response to the intermittent demand of the bagging machine 135 which includes the small surge bin 138 and the levelling eyes 140 and 142 for control of the delivery conveyor 16 through the motor 70 as described in the aforementioned co-pending application.

The liquid whether it be water or liquid nutrient, is stored within the tank 14. An air compressor, not shown, may be connected to the bottom of the storage tank by the conduit 72 for supply through the valve 74 of air to the tank. The air is supplied to the tank through the ring member 76 for agitation purposes. The liquid is drawn from the tank through the valve 78 and tubular screen mechanism 80 by the pump 82. The pump discharges the liquid through the tubular screen mechanism 86 into a supply conduit 84. The supply conduit 84 therefore introduces the liquid in spray form through spray mechanism generally referred to by reference numeral 88 as more specifically described in the aforementioned copending application. Also, the supply conduit 84 is connected to a pair of pressure gauges 104 and 106 forming part of the flow detecting system generally referred to by reference numeral 108 as more specifically described in the aforementionel co-pending application. Control over the supply of liquid is therefore exercised through the flow return control valves 126 and 128 and the cut-off valve 130.

Referring now to FIGURE 6 in particular, it will be observed that the solid nutrient introducing apparatus 144 includes a surge bin 160 within which the solid nutrients are collected for discharge into the contant speed conveyor 146. The solid nutrients that have been ground and screened are therefore supplied to the surge bin 160 through a bucket elevator mechanism generally referred to by reference numeral 162 which includes an inlet hopper portion 164 from which the solid nutrients are raised for delivery by the discharge chute 166 by the motor 168 at a rate that is automatically controlled in accordance with the level of the solid nutrients within the surge bin 160 by means of the levelling eye devices 170 and 172 in a manner well known to those skilled in the art. Accordingly, solid nutrients are maintained available in the surge bin 160 between the levelling eyes at all times so as to enable the process to continue indefinitely. The solid nutrients are discharged from the surge bin 160 through a vibrating mechanism 174 driven by means of the electric motor 176 for delivery of the solid nutrient materials at a constant volumetric flow rate preset by means of a control rheostat device 178 that controls the speed of the vibrator motor 176. The flow of solid nutrients from the vibrator mechanism 174 into the constant speed conveyor 146 is maintained at a constant volumetric rate of flow because the speed of the vibrating mechanism 174 is maintained constant while the level of the solid nutrient material within the bin 160 is automatically regulated through the levelling eyes.

Where it is desired to supply the solid nutrients at a constant weight rate of flow an alternative solid nutrient introducing apparatus is employed as illustrated in FIGURE 7. The apparatus generally referred to by reference numeral 180 in FIGURE 7 is similar to that FIGURE 6 in that a vertical bucket elevator mechanism 182 delivers the solid nutrient from the inlet hopper portion 184 to a surge bin 186 through the delivery portion 188, the rate of delivery being controlled by the bucket elevator motor 190. The bucket elevator motor 190 also maintains the level of the solid nutrient within the bin 186 constant between the levelling eyes 192 and 194. However, the speed of the vibrating mechanism 196 is not maintained constant at some present value by the vibrator motor 198 as described with respect to the motor 176 of the apparatus 144. Instead, the speed of the vibrator motor 198 is controlled by means of a position control switch device 200 electrically connected to the motor 198. The position control switch 200 responds to variations in the position of a lever support assembly 202 mounted in balanced condition upon a fulcrum support 204. The lever support assembly 202 is delicately balanced by shifting adjustment of the weight elements 206 and 208. Mounted on one side of the fulcrum support 204 on the lever support assembly 202 is an electric motor 210 which is belt connected by belt 212 to a drive pulley 214 about which a conveyor belt 216 is entrained. The conveyor belt 216 is also entrained about an idler pulley 218 rotatably mounted at the end of the lever support assembly 202 opposite the position responsive control device 200. It will be observed therefore, that when the motor 210 is energized, the conveyor belt 216 is moved so as to receive the solid nutrient material discharged by the vibrator mechanism 196 thereon for conveyance into the constant speed conveyor 146. Any variation in the weight rate of flow of the solid nutrient material will therefore change the balanced condition of the lever support assembly 202 operating through the position responsive control device 200 to change the speed of the vibrator motor 198 which is electrically connected to the position responsive control device 200 through a control device 220 through which speed range adjustment may be made. The speed of the vibrator motor 198 may be increased or decreased accordingly in order to restore the balance position of the lever support assembly 202. The control device 220 is utilized in order to change the predetermined weight rate of flow value from which any deviation will cause a corresponding change in the speed of the vibrator motor 198.

Referring now to FIGURE 8, another arrangement is illustrated for the introduction of the solid nutrient materials. A conveyor belt mechanism 222 is therefore provided upon which a plurality of solid nutrient delivery mechanism 224 (which may be either similar to that described with respect to FIGURE 6 or that described with respect to FIGURE 7 or some other form of delivery mechanism such as a paddle type rotary feeder) all discharge onto the belt 222 for mixing of different types and forms of nutrient material which is then delivered from the discharge end of the conveyor belt 222 into the constant speed conveyor 146. The arrangement of FIGURE 8 therefore is ideal for the purpose of supplying solid nutrients of different types, forms, particle sizes and in accordance with different flow rate standards. Accordingly, the apparatus may be adjusted, or portions thereof not used, so as to utilize nutrient ingredients that are available at any particular time or to produce a product in accordance with the particular demands of the customers at the time. It will also be appreciated from the foregoing, that the liquid supply mechanism may be disconnected should it be desired. On the other hand, the liquid supply mechanism may be operative through the spray nozzle mechanism 88 to supply liquid nutrient in conjunction with the solid nutrient introduced or merely water for the purpose of properly moistening the nutrient carrier or tree bark for best reception of the solid nutrient subsequently introduced.

From the foregoing description, the operation and utility of the process and apparatus associated therewith will be apparent. It will therefore be appreciated that the process of the present invention may be practiced with considerable degree of variation and may be controlled by a single operator in order to maintain it continuously operative despite variations in the demand of the bagging machine to which the process system is connected and more reliably supply a constant proportion of the ingredients properly conditioned for producing a product mixture in accordance with customer demand despite the non-uniformity of the raw materials from which the nutrient carrier is derived.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Apparatus for producing a fertilizing mixture of a raw carrier material and nutrients comprising, means for continuously reducing the raw material to carrier particles of random sizes, output flow indicating means for passing carrier particles of below a predetermined size suitable for continuous flow, variable conveyor means operatively connecting the material reducing means to the flow indicating means for selectively varying delivery of carrier particles to the flow indicating means to maintain a continuous output flow therefrom, flow metering means operatively connected to said flow indicating means for metering flow of the carrier particles below said predetermined size at a constant volumetric flow rate, means operatively connected to the metering means for introducing solid nutrients at a constant flow rate to the metered carrier particles under constant flow conditions, means for collecting a uniformly distributed mixture of said carrier particles and solid nutrients for intermittent withdrawal of quantities of said mixture, and controllable liquid supply means means operatively connected to the metering means for delivery of liquid at a constant flow rate to the metered carrier particles under constant flow conditions prior to the introduction of the solid nutrients.

2. The combination of claim 1 wherein said liquid contains nutrient ingredients.

3. The combination of claim 1, wherein said solid nutrient introducing means includes vibrating means driven at a constant rate of speed for delivering solid nutrients at a constant volumetric rate of flow directly into the metered carrier particles.

4. The combination of claim 1, wherein said solid nutrient introducing means includes vibrating means driven at variable rate of speed for varying the volumetric rate of discharge therefrom, and weight responsive conveying means operatively connected to the vibrating means for delivery of solid nutrient therefrom into the metered carrier particles and operative in response to variations in a predetermined weight of solid nutrients thereon to accordingly vary the volumetric rate of discharge from the vibrating means.

5. The combination of claim 1, wherein said solid nutrient introducing means includes, mixing conveyor means for delivering a mixture of solid nutrients to the metered carrier particles and a plurality of solid nutrient delivery means for simultaneously discharging solid nutrients at different constant flow rates onto the mixing conveyor means.

6. The combination of claim 5, wherein said liquid includes water for moisture conditioning the carrier particles for subsequent acceptance of the solid nutrients.

References Cited in the file of this patent

UNITED STATES PATENTS

| | | |
|---|---|---|
| 2,029,988 | Doe | Feb. 4, 1936 |
| 2,092,100 | Waynick | Sept. 7, 1937 |
| 2,150,164 | Heath et al. | Mar. 14, 1939 |
| 2,498,480 | Bierlich et al. | Feb. 21, 1950 |
| 2,779,670 | Burkett | Jan. 29, 1957 |
| 2,798,801 | Kieffer et al. | July 9, 1957 |
| 2,881,066 | Sproull et al. | Apr. 7, 1959 |
| 2,901,339 | Boomer | Aug. 25, 1959 |
| 2,946,666 | Eymann | July 26, 1960 |
| 2,985,643 | Boomer et al. | May 23, 1961 |
| 2,995,434 | Burton | Aug. 8, 1961 |
| 3,011,876 | Raistrick | Dec. 5, 1961 |